(12) United States Patent
Qutub et al.

(10) Patent No.: US 7,090,207 B2
(45) Date of Patent: Aug. 15, 2006

(54) SINGLE-END-MOUNT SEISMIC ISOLATOR

(75) Inventors: Abe Qutub, Beaverton, OR (US); Ted V. Mercer, Portland, OR (US); Michael B. Williams, Lake Oswego, OR (US)

(73) Assignee: DQP LLC, Beaverton, OR (US)

( * ) Notice: Subject to any disclaimer, the term of this patent is extended or adjusted under 35 U.S.C. 154(b) by 0 days.

(21) Appl. No.: 10/787,004

(22) Filed: Feb. 24, 2004

(65) Prior Publication Data
US 2004/0164473 A1 Aug. 26, 2004

Related U.S. Application Data

(60) Provisional application No. 60/449,158, filed on Feb. 24, 2003.

(51) Int. Cl.
*B60G 13/00* (2006.01)
*B60G 15/00* (2006.01)
*F16F 7/00* (2006.01)
*F16F 9/00* (2006.01)
*F16F 11/00* (2006.01)

(52) U.S. Cl. .................. 267/201; 267/205; 267/207; 267/135

(58) Field of Classification Search ............... 267/195, 267/196, 201, 205, 207, 214, 134, 135, 162
See application file for complete search history.

(56) References Cited

U.S. PATENT DOCUMENTS

| | | | | | |
|---|---|---|---|---|---|
| 2,359,915 | A | * | 10/1944 | Hussman | 267/135 |
| 2,678,796 | A | * | 5/1954 | Roy | 248/613 |
| 3,608,883 | A | * | 9/1971 | Russold et al. | 267/152 |
| 3,856,242 | A | | 12/1974 | Cook | |
| 3,973,078 | A | * | 8/1976 | Wolf et al. | 174/42 |
| 4,183,510 | A | | 1/1980 | Kontis | |
| 4,262,887 | A | * | 4/1981 | Jansen | 267/204 |
| 4,428,565 | A | * | 1/1984 | Stiefel et al. | 267/207 |
| 5,257,680 | A | * | 11/1993 | Corcoran et al. | 188/129 |
| 5,456,047 | A | | 10/1995 | Dorka | |
| 5,971,374 | A | | 10/1999 | Freeman | |
| 6,244,577 | B1 | | 6/2001 | Bucholtz | |
| 6,513,800 | B1 | | 2/2003 | Bucholtz et al. | |
| 6,517,060 | B1 | * | 2/2003 | Kemeny | 267/136 |

OTHER PUBLICATIONS

Carl Fenstermacher, "Introduction to Friction Springs and Their Use," White Paper, (undated, believed to be published before Feb. 2003), Ringfeder Corporation, 2 pages.

Ringfeder Corporation, "Friction Rings in Mechanical Engineering," catalog (undated, believed to be published before Feb. 2003), 8 pages.

* cited by examiner

*Primary Examiner*—Devon C. Kramer
(74) *Attorney, Agent, or Firm*—Stoel Rives LLP

(57) ABSTRACT

A single-end-mount seismic isolator for protecting a structure from the effects of seismic shock or other external applied forces includes a load shaft that is secured at its first end to a mounting surface on which the structure is supported. So secured, the load shaft projects beyond a base of the structure, on which an actuator is supported. A resilient element, such as a friction spring, is operably interposed between the load shaft and the actuator to allow relative motion between the structure and the mounting surface in the event of a seismic shock or other external applied force. The resilient element also absorbs energy of such motion. The single-end-mount design facilitates seismic retrofitting of existing structures and servicing of seismic isolators in the field. In dual-action embodiments, the resilient element includes primary and secondary resilient elements for damping in two directions.

30 Claims, 6 Drawing Sheets

SINGLE-END-MOUNT SEISMIC ISOLATOR

RELATED APPLICATIONS

This application claims the benefit under 35 U.S.C. § 119(e) of U.S. Provisional Patent Application No. 60/449,158, filed Feb. 24, 2003, which is incorporated herein by reference in its entirety.

TECHNICAL FIELD

This application relates to devices and methods for isolating a structure, such as a column supporting electrical or utility equipment, from the effects of seismic shock or other external forces.

BACKGROUND OF THE INVENTION

In electrical stations and sub-stations, there exists valuable electrical equipment mounted on supporting structures including steel columns that are attached to cement foundations. Such electrical equipment is of substantial value and its failure can disrupt electrical service within the service area of the electrical station or sub-station. Such disruptions can also have potentially damaging or disruptive ripple effects beyond the service area, on other parts of a power transmission system. Natural forces, such as earthquakes and high winds, and other external forces are a potential cause of failure for such equipment and for other types of valuable electrical and utility equipment, such as microwave signal towers, television and radio antennas, mobile telephone antennas, street lights, traffic signals, and the like.

The columns used in equipment support structures are commonly fabricated of steel pipes or beams (e.g., I-beams) welded to steel footings, which are bolted down securely to mounting studs embedded in concrete foundations. When forces such as a seismic event or high winds are applied, the column bends and the structure sways laterally. The severity, duration, and frequency of the forces; the column structural design; the column connecting system; and the mass of the equipment all impact whether the column and/or the equipment will sustain structural or functional damage from the forces. Thus, there is a need to isolate the electrical equipment and supporting columns from natural events, such as seismic events and high winds, and from other forces, in order to prevent damage to the equipment.

The column connecting system, where the base of the structure is typically securely bolted down to a concrete platform or other foundation, provides virtually no motion isolation for the electrical equipment, although a very small amount may be afforded by inherent flexibility of the column. To prevent damage and ensure the survival of the equipment and the structure, motion isolation systems are sometimes used to resist applied loads and to dampen vibration.

Single-acting spring isolators, which absorb energy in only one direction, are known for use in new equipment installations and for retrofitting existing installations. However, such isolators are installed between the concrete foundation and the base of the support structure in a dual-end-mount configuration. The present inventors have recognized that isolators of a dual-end-mount configuration are difficult to service, once installed. Furthermore, the inventors have noted that retrofitting in this configuration requires excessive installation expense, as the site must be shut down, the support structure must be detached from the foundation, and then the support structure must be reinstalled on the isolator. Before reinstallation of the support structure on the isolator, a section of the support structure equal in length to the isolator must typically be removed, which requires the base or other part of the structure to be rewelded and regalvanized.

U.S. Pat. No. 5,971,374 of Freeman describes a dual-acting seismic damper that dissipates energy in response to both upward and downward forces on large electrical equipment. The seismic damper described by Freeman is mounted between the equipment support structure and a foundation in a dual-end-mount configuration. Consequently, the damper of Freeman suffers from the same shortcomings in serviceability and retrofitting as described above. Additionally, it uses a single spring for resisting forces in both the upward and downward directions. The present inventors have recognized that the single spring configuration of Freeman does not provide effective damping during the rebound after upward or downward motion.

U.S. Pat. No. 3,856,242 of Cook describes a mounting apparatus for a surge voltage arrester comprising two sets of Belleville springs arranged on a bolt that extends from a mounting body through a hole in a supporting foot of the surge voltage arrester. One of the sets of Belleville springs is positioned beneath the foot of the surge voltage arrester, between a first side of the foot and the mounting body. The other set is positioned above the foot, between a second side of the foot and the bolt. As with the seismic damper of Freeman (U.S. Pat. No. 5,971,374), the mounting apparatus of Cook includes components mounted between the equipment support structure and its foundation. Consequently, it too suffers from the shortcomings in serviceability and retrofitting described above.

Thus, the inventors have recognized a need for an improved seismic isolator and for improved methods of retrofitting existing structures, such as columns supporting electrical or utility equipment.

SUMMARY OF THE INVENTION

Seismic isolators in accordance with preferred embodiments include a load shaft that is secured at its first end to a mounting surface on which a structure is supported. So secured, the load shaft projects beyond a base of the structure, on which an actuator of the seismic isolator is supported. A resilient element, such as a friction spring, is operably interposed between the load shaft and a driver of the actuator, which is spaced away from the base. In the event of a seismic shock or other external applied force, the resilient element allows relative motion between actuator and the load shaft and, consequently, between the mounting surface and the structure. The resilient element preferably absorbs or dissipates a significant amount of energy of such motion, to gently decelerate the structure and prevent damage thereto.

In a dual-action embodiment, the resilient element includes a primary resilient element and a secondary resilient element for damping in two directions. In certain preferred embodiments, adjustment mechanisms are provided for preloading of the primary and secondary resilient elements, thereby affording control over the range of movement of the structure and allowing the damping to be tuned for a particular structure and environment of use.

Single-end-mount isolators in accordance with the preferred embodiments may be installed and serviced without moving the structure. Advantageously, a structure with a conventional rigid mounting system may be retrofitted with single-end-mount isolators in accordance with the preferred embodiments by loosening or removing an existing mounting nut from a mounting stud at the base of the structure, and attaching the load shaft of the seismic isolator to the mounting stud so that the actuator is supported over the base. The actuator may then be secured to the base by bolts or welds.

Additional aspects and advantages of this invention will be apparent from the following detailed description of preferred embodiments, which proceeds with reference to the accompanying drawings.

BRIEF DESCRIPTION OF THE DRAWINGS

In the drawing figures, like reference numbers refer to like elements.

DETAILED DESCRIPTION OF PREFERRED EMBODIMENTS

Throughout the specification, reference to "one embodiment," "an embodiment," or "some embodiments" means that a particular described feature, structure, or characteristic is included in at least one embodiment. Thus, appearances of the phrases "in one embodiment," "in an embodiment," or "in some embodiments" in various places throughout this specification are not necessarily all referring to the same embodiment. Furthermore, the described features, structures, or characteristics may be combined in any suitable manner in one or more embodiments. Moreover, the various embodiments can be practiced without one or more of the specific details or with other methods, components, materials, etc. In other instances, well-known structures, materials, or operations are not shown or not described in detail to avoid obscuring aspects of the embodiments.

Figure 1:
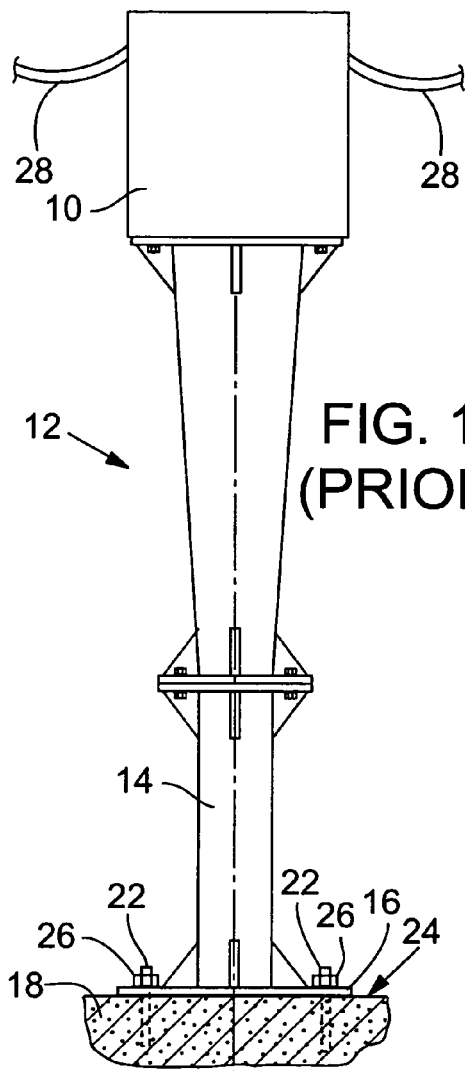
FIG. 1 is a side elevation view of an item of electrical equipment and a support structure therefor, illustrating an exemplary environment of use for single-end-mount seismic isolators in accordance with the preferred embodiments.

FIG. 1 is a side elevation view of an item of electrical equipment 10 supported on an upstanding structure 12 representing an exemplary environment of use for seismic isolators 30, as described herein. With reference to FIG. 1, structure 12 includes a support column 14 having a base 16 that rests on a concrete foundation 18 or other support body. In accordance with prior art attachment methods, multiple threaded mounting studs 22 are permanently anchored in foundation 18 and extend upwardly from a mounting surface 24 of foundation 18 through holes or slots in base 16. A typical configuration includes four mounting studs 22 (only two are visible in FIG. 1) that extend through holes in each corner of a square base plate. Base 16 is securely attached to mounting studs 22 by mounting nuts 26 threaded onto each of the mounting studs 22. Although FIG. 1 depicts only a single mounting nut 26 on each mounting stud 22, two nuts 26 may often be used to prevent inadvertent loosening.

As described in the Background of the Invention section herein, conventional rigid anchoring of the kind shown in FIG. 1 provides virtually no motion isolation and damping for electrical equipment 10 and structure 12, which can sustain catastrophic damage in the event of a significant seismic shock or other external force. It is therefore desirable to allow some relative movement between structure 12 and foundation 18 to prevent damage to structure 12 and equipment 10. However, because equipment 10 is typically connected to other electrical equipment by power lines 28, the amount of movement allowed must be limited to avoid pulling lines 28 loose or applying tension that can damage equipment to which lines 28 are connected.

Figure 2:
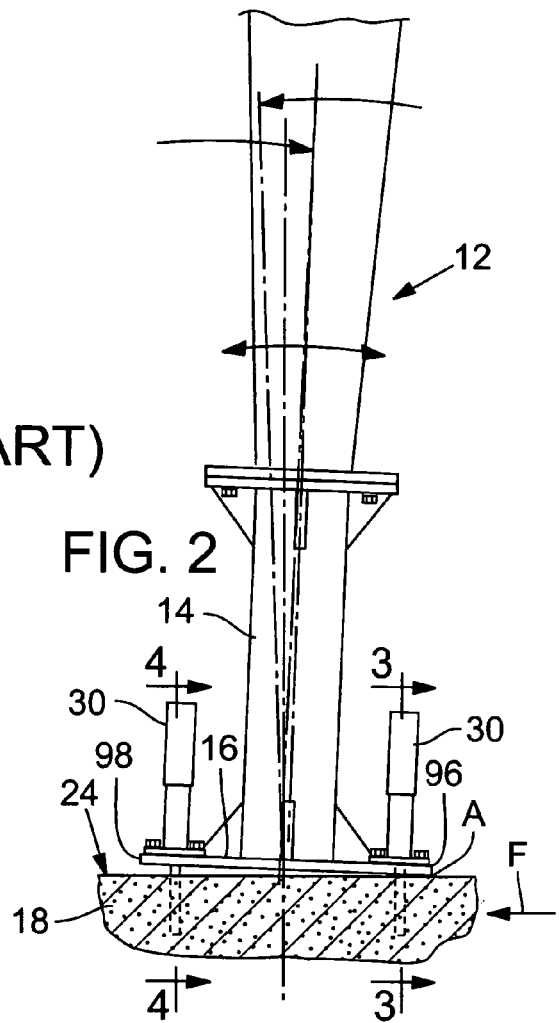
FIG. 2 is an enlarged side elevation view of the support structure of FIG. 1 showing seismic isolators installed to allow the support structure to tilt relative to its foundation in the event of a laterally-acting seismic shock.

FIG. 2 is an enlarged view of the lower portion of structure 12 of FIG. 1 shown with mounting nuts 26 removed and the structural anchoring system retrofitted with seismic isolators 30, in accordance with a first preferred embodiment. With reference to FIG. 2, seismic isolators 30 include an elongate structure and resilient mechanism that allows structure 12 to tilt or rock relative to foundation 18 in the event of seismic shock or an external force having a horizontal force component, as indicated by arrow "F". Allowing structure 12 to tilt in a controlled manner relative to foundation 18 (and, in some instances, to lift) reduces the acceleration of equipment 10 and structure 12 in the event of a shock and thereby attenuates the effect of potentially destructive external forces. As described in further detail below, isolators 30 generally also provide damping by absorbing or dissipating energy of such tilting or rocking motion, thereby preventing destructive harmonic oscillation, reducing rebound acceleration, and helping structure 12 to quickly settle back to its resting position after the seismic shock or other external force has subsided.

Advantageously, each isolator 30 is mounted to structure 12 and foundation 18 at a common end of the isolator. This mounting configuration is referred to herein as a "single-end-mount" configuration. This single-end-mount design allows existing structures, such as column 14 of FIG. 1, to be seismically retrofitted with isolators 30, without moving or significantly altering the structure. The single-end-mount design is also useful for new structure installations because it facilitates servicing, inspection, and replacement of isolators 30 in the field, when necessary. Seismic isolators in accordance with the preferred embodiments may also be made of entirely metal construction for superior durability and reliability.

Figure 3:
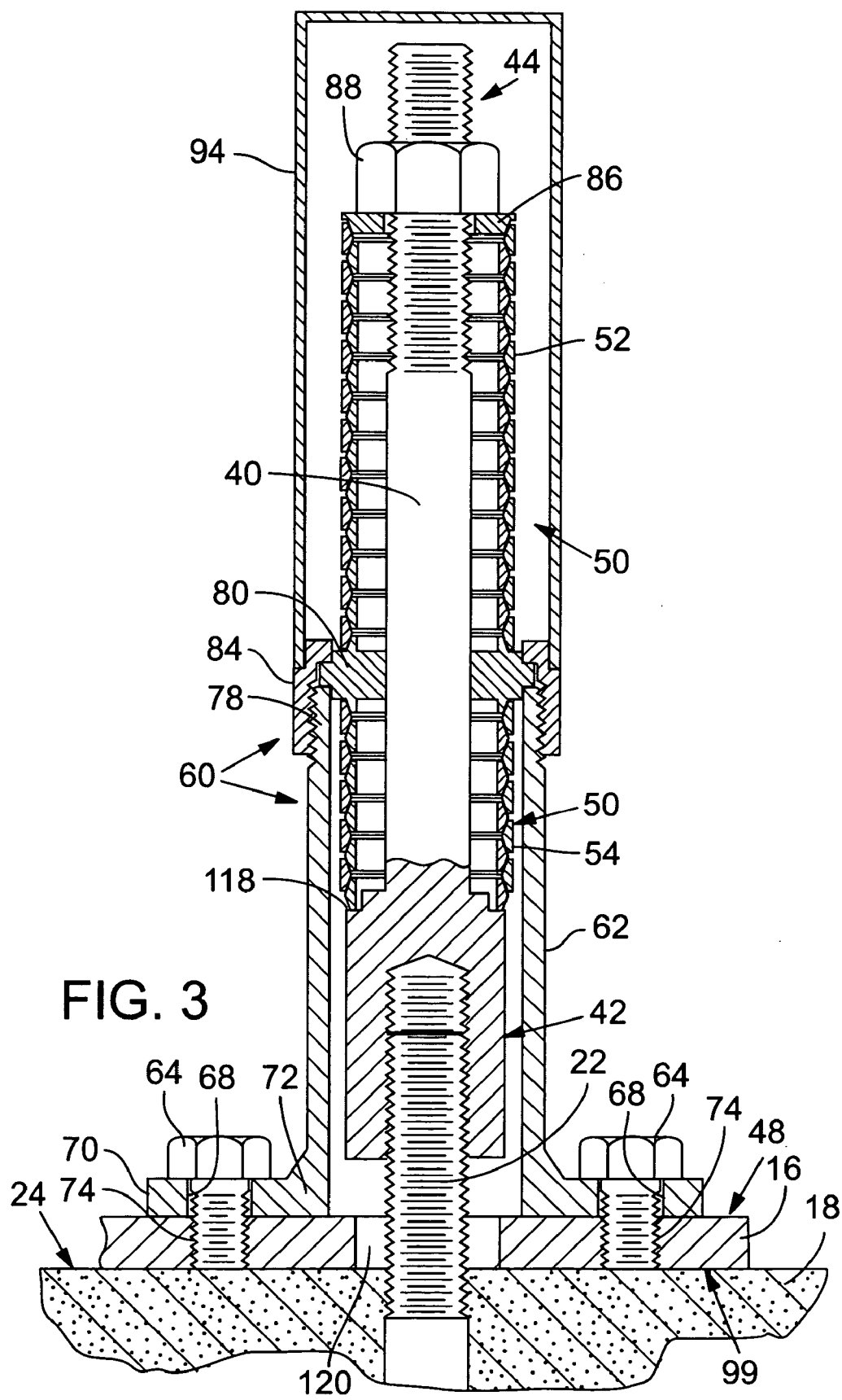
FIG. 3 is an enlarged side sectional view taken along lines 3—3 of FIG. 2, showing a dual-acting seismic isolator in accordance with a first embodiment.
Figure 6:
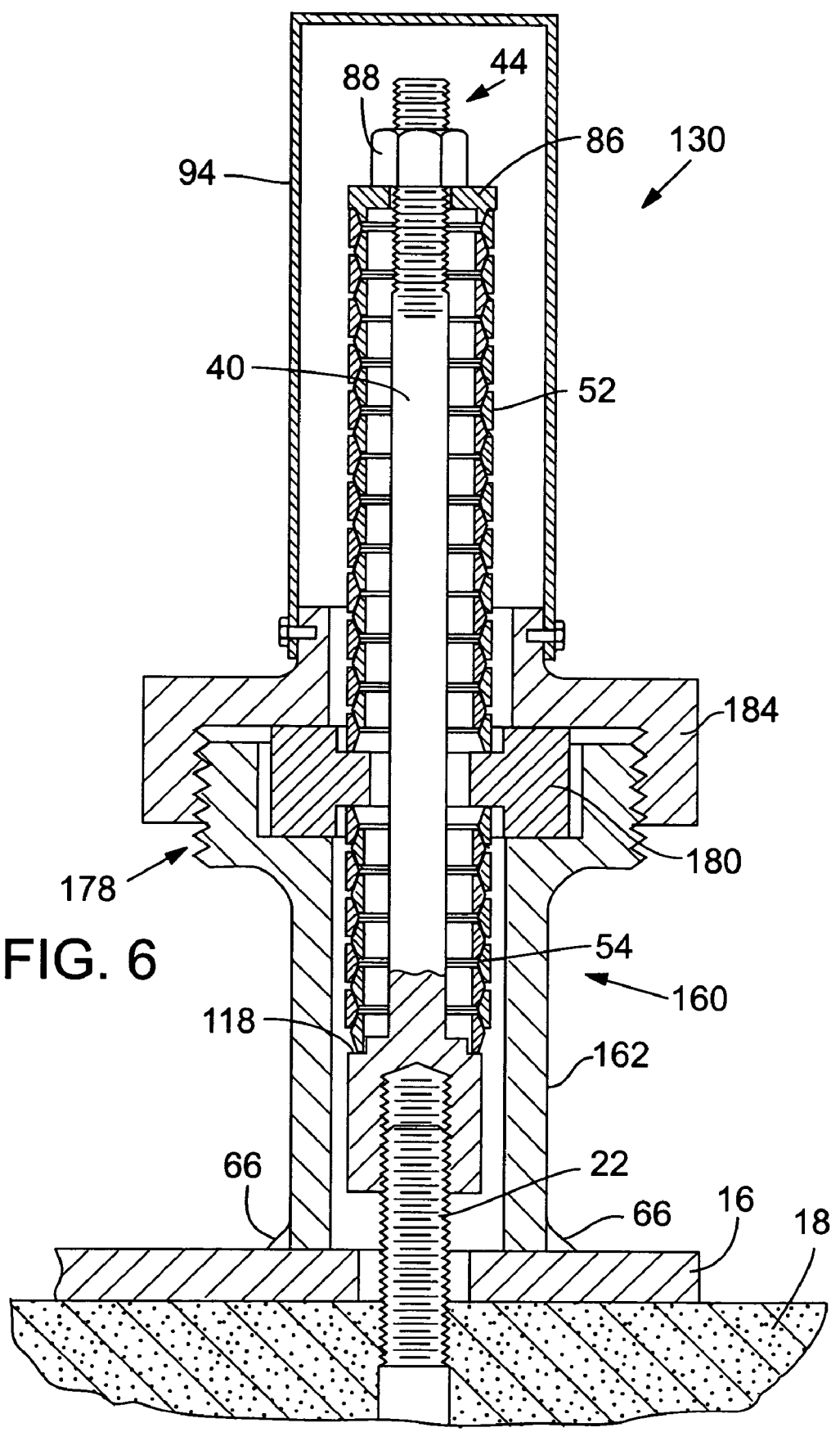
FIG. 6 is a side sectional view of a dual-acting seismic isolator in accordance with a second embodiment, showing an actuator of the isolator secured to a base of the structure with welds.

FIG. 3 is an enlarged side sectional view taken along lines 3—3 of FIG. 2, showing a dual-acting seismic isolator 30 in accordance with a first preferred embodiment. With reference to FIG. 3, isolator 30 includes a load shaft 40 having a first end 42 secured to mounting surface 24 via mounting stud 22 and a second end 44 that projects beyond an outer surface 48 of base 16. A resilient element assembly 50 is supported on load shaft 40 and includes a primary resilient element 52 positioned nearest second end 44 of load shaft 40 and a secondary resilient element 54 positioned nearest first end 42. An actuator 60 of isolator 30 is supported on base 16 and preferably includes a tubular actuator stem 62 that is attached to base 16 by one or more bolts 64 or welds 66 (FIG. 6). In the embodiment of FIG. 3, bolts 64 extend through mounting holes 68 in a flange 70 of actuator stem 62 at its mounting end 72 and are threaded into tapped holes 74 in base 16, which may be drilled and tapped in the field for retrofitting of existing structures. Actuator stem 62 extends from base 16 outwardly to a location medially of first and second ends of load shaft 40, where a driving end 78 of actuator 60 supports an annular driver 80 of actuator 60 between primary and secondary resilient elements 52 and 54. Driver 80 is securely attached to driving end 78 by a threaded locking ring 84 having female threads that mate with male threads formed around the circumference of driving end 78. A cap 86, mounted on load shaft 40 at its second end 44 by a retaining nut 88, retains primary resilient element 52 on load shaft 40 and applies a preload force for partially compressing primary resilient element 52 between cap 86 and driver 80. A cover 94 is fitted over second end 44 of load shaft 40 and seated on actuator 60 to protect isolator 30 from the environment and to prevent tampering.

As shown in FIG. 2, load shaft 40 is preferably a solid bolt-like member threaded at its second end 44 and extending axially through the center of resilient element assembly 50. However, in alternative embodiments, load shaft 40 may comprise different kinds of elongate load-bearing structures, such as a hollow external structure within which resilient element assembly 50 may be encased or partially enclosed. Thus, the term "shaft" is intended to encompass both a solid axial member and a hollow elongate member (as in the sense of an "elevator shaft") that serves as a guide for resilient element assembly 50.

Figure 4:
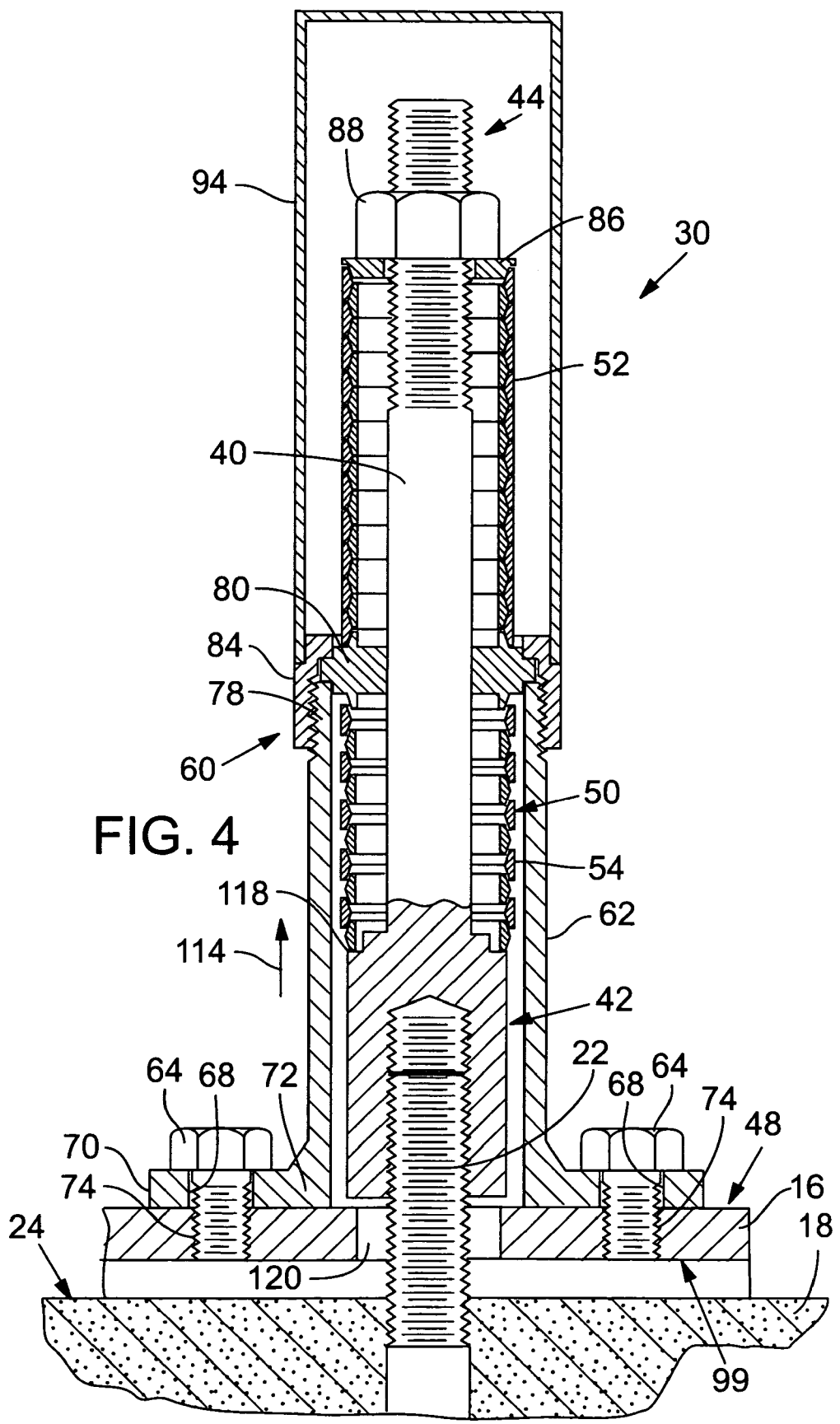
FIG. 4 is an enlarged side sectional view taken along lines 4—4 of FIG. 2, showing a second seismic isolator with a primary resilient element compressed in response to tilting or lifting of the structure relative to its foundation.

FIG. 4 is an enlarged side sectional view taken along lines 4—4 of FIG. 2, showing a seismic isolator 30 substantially identical to the one shown in FIG. 3, but with its primary resilient element 52 compressed in response to tilting or lifting of the structure 12 relative to foundation 18. As depicted in FIGS. 2 and 4, when a lateral seismic force "F" drives foundation 18 laterally from right to left, structure 12 tends to rotate relative to foundation 18 in a clockwise direction about a pivot point "A" located at a right margin 96 of base 16. The isolators 30 located at a left margin 98 of base 16 will yield to allow the left margin 98 of base 16 to lift relative to foundation 18 in the region of such isolators 30. Isolators 30 will also resist such rotation via a reactive downwardly-directed force on base 16 that is generated by compression of primary resilient element 52 between actuator 60 and cap 86. For convenience of illustration, the right margin 96 of base 16 and isolators 30 mounted at right margin 96 are depicted in FIG. 3 as being at rest, with an adjacent inner surface region 99 of base 16 pressed against foundation 18. However, in practice the inner surface 99 and isolators 30 at the right margin 96 may be lifted slightly, due to their distance from pivot point "A".

Actuator 60 preferably comprises a tubular member, as shown in FIGS. 3 and 4, but may include structural members of different shapes, sizes, configurations, and positions for transmitting force from base 16 (or another part of structure 12) to primary and secondary resilient elements 52 and 54. Driver 80 is preferably an annular extension of actuator 60, but may include other driving or contacting members that are not annular. The driver may be a removable component of actuator 60 (such as driver 80 of FIGS. 3 and 4 and driver 180 of FIG. 6) or an integral part of actuator 60 (such as driver 280 of FIG. 7 and driver 380 of FIG. 8).

Figure 5A:
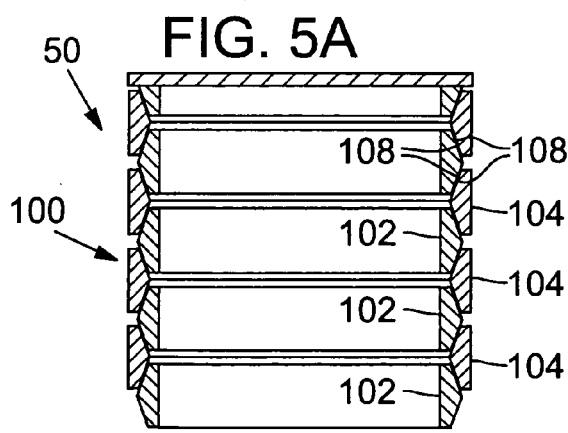
FIG. 5A shows a friction spring of the seismic isolators of FIGS. 2–4 and 6–8 in an uncompressed or pre-load condition.
Figure 5B:
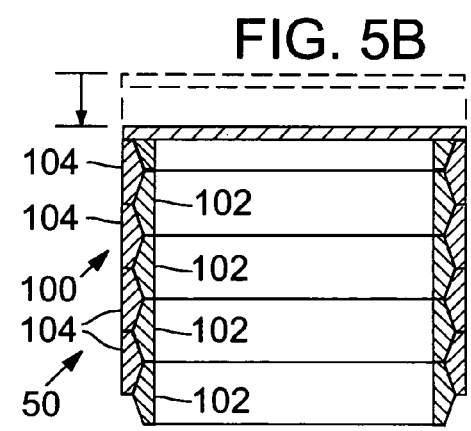
FIG. 5B shows the friction spring of FIG. 5A in a loaded, fully compressed condition.

In the preferred embodiments, primary and secondary resilient elements 52 and 54 include sets of friction springs, for example of the type sold commercially under the name RING-spring™ by Ringfeder Corporation, Westwood, N.J., USA. FIG. 5A is an enlarged sectional view of a portion of resilient element assembly 50 comprising a set of friction springs 100, including a series of alternating inner and outer rings 102 and 104, respectively, with mating taper faces 108. FIG. 5A depicts the set of friction springs 100 in an uncompressed condition or with a small preload. FIG. 5B depicts the set of friction springs 100 in a loaded, fully compressed, and blocked condition.

Friction springs 100 are desired for their durability, their damping attributes, and their load-handling capabilities. They are available in a wide range of sizes, having a variety of spring force, travel, and energy absorption characteristics. The number of rings 102,104 in a set can be increased to provide increased travel and energy absorption characteristics, without changing the load-handling capacity of the set. In some embodiments, two sets of friction springs (not shown) may be configured in parallel, by nesting or otherwise, for increased load-handling and damping characteristics, without significantly changing the spring travel. Friction springs 100 can also be preloaded without any appreciable effect over time on their maximum load-handling capacity. Thus, it is possible to customize the design of the primary and secondary resilient elements 52 and 54 for a particular application, through the strategic selection of the size and number of friction spring rings. For example, primary resilient element 52 may comprise friction springs of a first size and number of ring elements, while secondary resilient element 54 may comprise friction springs of a different size and ring count. The quantity of rings used for each of the primary and secondary resilient elements 52 and 54 may range from as few as two to as many as 50 or more. Friction springs sold commercially by Ringfeder Corporation are available with maximum spring force characteristics in increments ranging between 11 kN and 1,800 kN, with corresponding spring travel ranging between 0.4 mm and 7.6 mm per ring element and corresponding energy absorption capability ranging between 1.0 J and 6,840 J per ring element, wherein a ring element comprises an engaged pair of taper faces 108—i.e., one half of an inner ring 102 and one half of an outer ring 104. Specially fabricated friction springs have also been made to provide up to 10,000 kN of spring force.

In alternative embodiments (not shown), primary and secondary resilient elements 52 and 54 may include virtually any other type of resilient device or material having a significant spring function, such as wafer springs, disc springs, coil springs, hydraulic devices, pneumatic devices, spring and damper assemblies, elastomeric bushings, and the like, and combinations thereof.

Referring again to FIG. 4, primary resilient element 52 resists relative motion between actuator 60 and load shaft 40 in a first direction, when base 16 drives actuator 60 outwardly (as indicated by arrow 114) along load shaft 40 to compress primary resilient element 52. Secondary resilient element 54 is operably interposed opposite the primary resilient element 52 between driving end 78 of actuator 60 and mounting surface 24, to thereby resist rebound motion in a second direction opposite the first direction. To increase damping and spring resistance in the second direction, secondary resilient element 54 is preferably preloaded when installed. For example, the friction spring set 100 of secondary resilient element 54 may be preloaded in the range of between approximately 5% and approximately 90% of the maximum spring force of the set. More preferably, secondary resilient element 54 is preloaded in the range of approximately 75% to 80% of the maximum spring force of the set 100, which corresponds to approximately 75% to 80% of the maximum travel of the set. In some embodiments, the preload of secondary resilient element 54 may be sufficient to lift base 16 from mounting surface 24 to provide true motion isolation in the vertical direction. The amount of preload may be established by selecting a desired size of secondary resilient element 54 and a desired length of actuator 60. The preload of secondary resilient element 54 can also be adjusted by tightening or loosening load shaft 40 on mounting stud 22. In some embodiments, the amount of preload applied to secondary resilient element 54 may be adjusted by turning threaded locking ring 84 to adjust the position of driver 80 along load shaft 40.

Preloading of primary resilient element 52 is accomplished by tightening retaining nut 88 to adjust the position of cap 86 and compress primary resilient element 52 between cap 86 and driver 80. The amount of preload applied is selected based on the desired maximum amount of tilt of structure 12, which may be limited by the presence of overhead power lines 28 (FIG. 1), for example. Increasing the preload reduces the maximum amount of travel and increases the immediate damping characteristics of the friction springs 100 of primary resilient element 52. The friction spring set 100 of primary resilient element 52 may be preloaded in the range of between approximately 5% and approximately 90% of the maximum spring force of the set, for example. In some embodiments, the primary and secondary resilient elements 52 and 54 are preloaded with the same amount of end force, to reduce or eliminate the tension on actuator 60, when structure 12 is at rest. However, in other embodiments the primary and secondary resilient elements 52 and 54 may be differentially preloaded, to achieve the improved damping, spring response, and travel characteristics described above.

In general, the spring force capacity of primary resilient element 52 can be selected by solving the equation for the sum of moments either about pivot point "A" (FIG. 2), or about the center of mass of the assembly of structure 12 and equipment 10. Predetermined inputs to this equation include (1) the physical dimensions, mass, and mass moment of inertia of the assembly of structure 12 and equipment 10; (2) the mean peak horizontal ground acceleration in the event of a seismic shock; and (3) the desired maximum travel of equipment 10, or the desired peak acceleration of equipment 10, or both. For purposes of design calculations and testing, the mean peak horizontal acceleration of foundation 18 is assumed to be 0.5 g (4.9 m/sec$^2$), based on widely accepted test standards described in IEEE Std 693-1997, titled "IEEE Recommended Practice for Seismic Design of Substations" (hereinafter "IEEE-693"), which is published by the Institute of Electrical and Electronics Engineers, Inc. and incorporated herein by reference. Following initial calculations of the required load-handling capacity of primary resilient element 52, the primary and secondary resilient elements 52 and 54 may be further sized and tuned to provide sufficient damping and motion restraining capabilities for the particular application. One preferred configuration and sizing of resilient element assembly 50 is described in the example, below, in the context of an item of electrical equipment in an electrical power substation.

As described above, secondary resilient element 54 is operably interposed between driving end 78 of actuator 60 and mounting surface 24, so that movement of actuator 60 toward mounting surface 24 therebetween imparts compressive force on secondary resilient element 54. In the preferred embodiment, this operative arrangement is achieved by capturing secondary resilient element 54 between driver 80 and an opposing radially-extending shoulder 118 of load shaft 40 located proximal of first end 42. Capturing secondary resilient element 54 between shoulder 118 and driver 80 allows isolator 30 to be pre-assembled to facilitate installation and retrofitting of existing structures. It also avoids the need to widen the holes 120 in base 16 through which mounting studs 22 extend, as required in alternative embodiments to allow secondary resilient element 54 to extend through base 80 and seat directly against mounting surface 24 (not shown).

To retrofit an existing structure with a conventional rigid mount of the type shown in FIG. 1, the mounting nuts 26 are first removed (or loosened to leave a sufficient gap between the nuts 26 and base 16), load shaft 40 is attached to mounting stud 22, and actuator 60 is positioned over base 16. If resilient element assembly 50 has not been pre-assembled on load shaft 40, it may be thereafter installed and preloaded to complete the retrofitting process. If a dual-acting isolator is used, its actuator 60 must be secured to base 16 by bolts 64 (FIG. 3) or welds 66 (FIG. 6). For a single-acting isolator of the type described below with reference to FIG. 8, securing the actuator to the base is optional.

FIG. 6 is a side sectional view of a dual-acting seismic isolator 130 in accordance with a second embodiment. An actuator 160 of isolator 130 is secured to base 16 of structure 12 with welds 66, eliminating the need to drill and tap holes 74 in base 16 (FIGS. 3 and 4). A driver 180 of isolator 130 is located near driving end 178 of actuator 160 and is sized to apply a selected amount of preload to secondary resilient element 54 when locking ring 184 is tightened to actuator stem 162. Driver 180 may be replaced with a driver of a different size or shape when it is desirable to adjust the preload of secondary resilient element 54.

Figure 7:
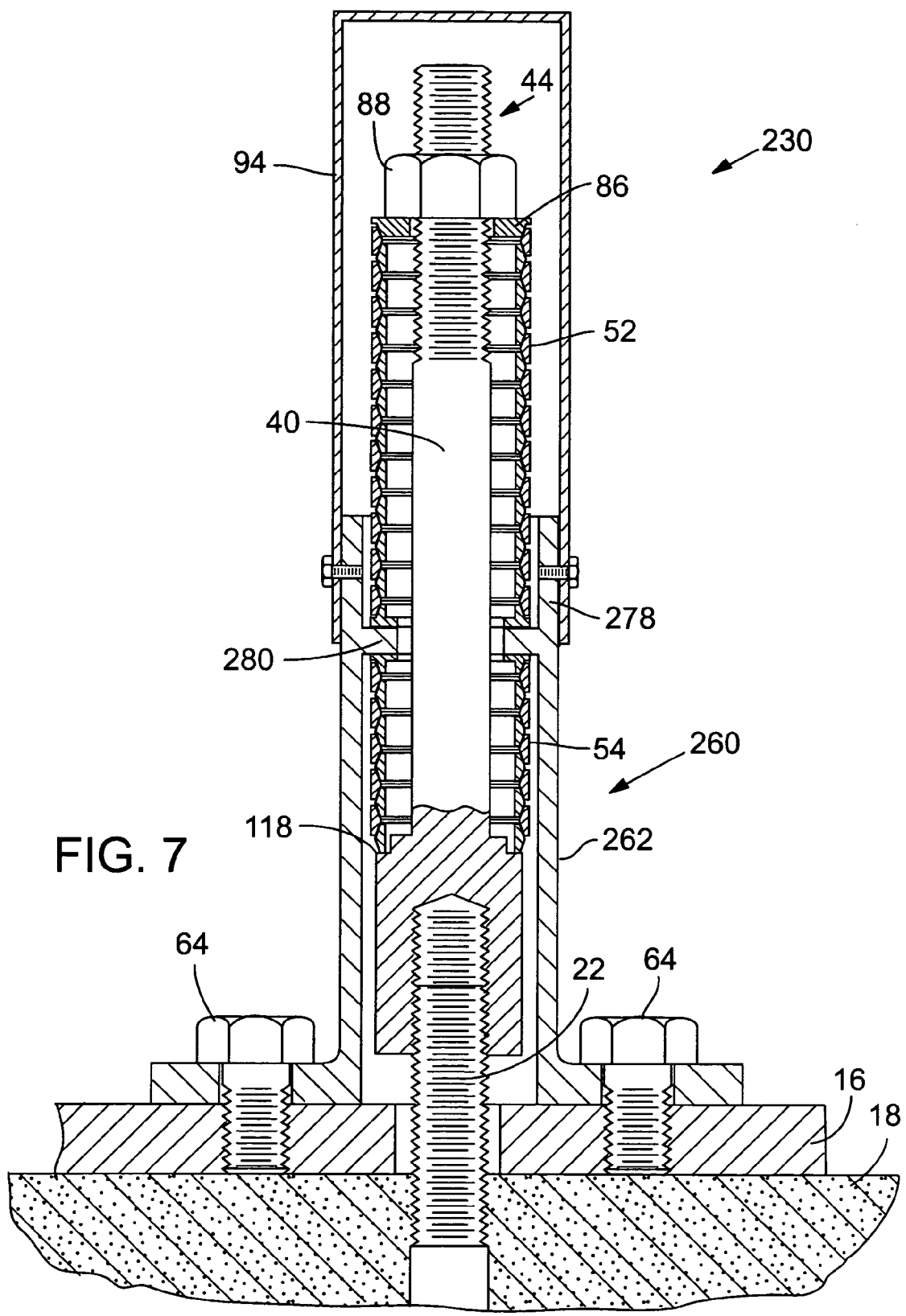
FIG. 7 is a side sectional view of a dual-acting seismic isolator in accordance with a third embodiment.

FIG. 7 is a side sectional view of a dual-acting seismic isolator 230 in accordance with a third embodiment. With reference to FIG. 7, driver 280 comprises an annular shelf integrally formed of one-piece construction with actuator stem 262 and extending radially inward from the tubular body of actuator stem 262 proximal of a driving end 278 of actuator 260. In isolator 230, the preload of secondary resilient element 54 is increased by loosening load shaft 40 on mounting stud 22 and decreased by tightening load shaft 40 on mounting stud 22.

Figure 8:
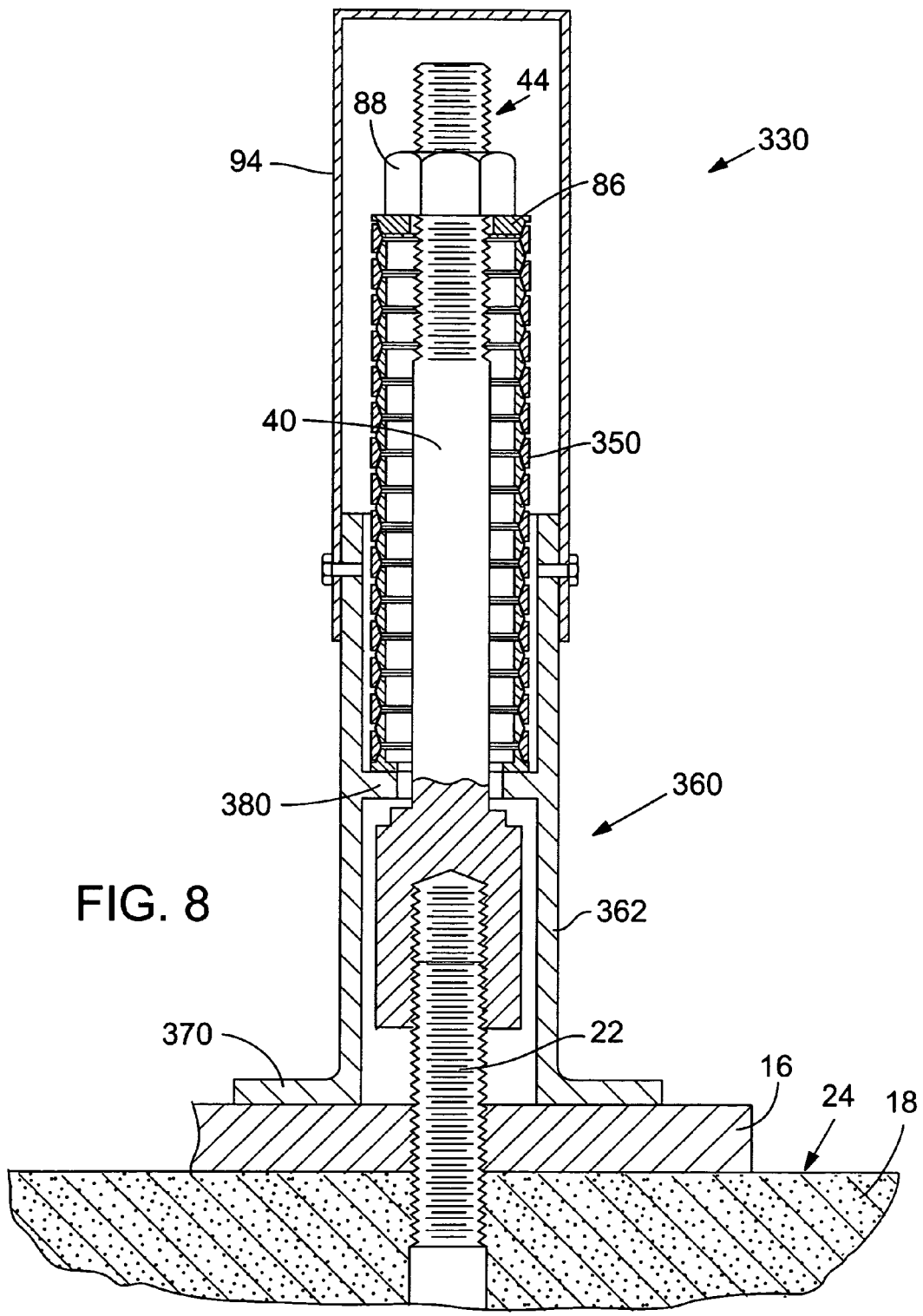
FIG. 8 is a side sectional view of a single-acting seismic isolator in accordance with a fourth embodiment.

FIG. 8 is a side sectional view of a single-acting seismic isolator 330 in accordance with a fourth embodiment. With reference to FIG. 8, single-acting seismic isolator 330 includes a single resilient element 350 operably interposed between an integral driver 380 of actuator 360. As distinguished from dual-acting isolators 30, 130, and 230 of FIGS. 2–7, actuator 360 of single-acting isolator 330 need not be secured to base 16. Instead, a flange 370 of actuator 360 may be firmly supported on base 16 so that actuator 360 is driven away from foundation 18 and mounting surface 24 in the event of outward movement of base 16, to thereby compress resilient element 350 against cap 86. However, the absence of a secondary resilient element in isolator 330 means there is no spring force opposing rebound motion and limits the amount of dampening that will occur during the rebound after compression of resilient element 350. Nevertheless, single-acting isolator 330 is of a single-end-mount design similar to dual-acting isolators 30, 130, and 230, and the simplified design of single-acting seismic isolator 330 may be appropriate for some end-use applications.

Due to their durability and ease of installation and repair, seismic isolators in accordance with the embodiments described herein are particularly well suited to isolating equipment and structures of electric power systems from the effects of seismic shock and other external applied forces. However, the illustration herein of preferred embodiments in conjunction with electrical equipment 10 and its supporting structure 12 is not intended to limit the scope of the various embodiments, their methods of installation, operation, or use. For example, isolators described herein may be used with other kinds of valuable electrical and utility equipment, including microwave signal towers, television and radio antennas, mobile telephone antennas, street lights, traffic signals, and the like. The seismic isolators described herein may also be used in conjunction with many other kinds of structures, including structures used for other than electrical equipment and structures having a wide range of shapes, orientations, sizes, and mounting positions. In large installations, many isolators (e.g., dozens or hundreds) may be installed to share the seismic load in the event of a shock. Thus, the isolators described herein are useful in any environment in which there is a need to isolate a structure or articles supported thereon from the effects of seismic shock or other external applied forces, such as high winds, floodwaters, vibration, collisions, and the like. For example, seismic isolators of the type described herein may be used to provide motion isolation and damping for buildings ranging in size from residential structures to skyscrapers. In architectural installations, seismic isolators having a single-end-mount design may be oriented generally horizontally, in alignment with a slip plane of the structural footing. Seismic isolators may also be used to provide isolation of diagonal strut braces in a building or other structure. Thus, the use herein of terms such as "on", "over", and "above" to describe the position of load shaft 40 and actuators 60, 160, 260, and 360 relative to base 16, mounting surface 24, and structure 12 is not intended to require the seismic isolators 30, 130, 230, and 330 to be oriented vertically. Rather, the terminology is intended to describe operational relationships between the isolators and the mounting surfaces and structural elements movably coupled by the isolators.

EXAMPLE

A double-acting isolator according to the embodiments shown in FIGS. 3–6 was tested using a test structure simulating the structure 12 and equipment 10 shown in FIGS. 1 and 2. Equipment 10 was represented by a 2,500 pound (1,130 kg) mass positioned on top of an 8 foot (2.44 m) tall structural steel column measuring 9 inches (22.9 cm) in diameter with 0.75 inch (1.9 cm) thick steel plates welded at each end. The center of gravity of the 2,500 pound mass was located 12.7 feet (3.87 meters) above a shaker table (representing foundation 18) on which the column was supported. The base plate for the column was connected to four (4) one-inch (2.54 cm) diameter mounting studs equally spaced 1.9 feet (57.9 cm) apart, at the four corners of the base plate.

The isolator included a primary resilient element having 32 friction spring elements (17 outer rings and 16 inner rings) rated at 9,000 lbs. force (40 kN) and a secondary resilient element having eight of the same 9,000 pound (40 kN) friction spring elements (five outer rings and four inner rings). The friction springs of the primary and secondary resilient elements were both preloaded to 80% of the total rated load to meet the desired damping characteristic.

The shaker table was driven to the required response spectrum for IEEE-693 at 0.5 g (4.9 m/sec$^2$). Sensors were used to measure the acceleration of the 2,500 pound mass and the vertical deflection of the base plate off the shaker table. Test results showed a maximum total deflection of 0.176 inch (4.47 mm) and a 50% reduction in the peak acceleration at the 2,500 pound mass (reduced from 2.031 g (19.9 m/sec$^2$) to 0.996 g (9.77 m/sec$^2$)).

It will be obvious to those having skill in the art that many changes may be made to the details of the above-described embodiments without departing from the underlying principles of the invention. The scope of the present invention should, therefore, be determined only by the following claims.

The invention claimed is:

1. A seismic isolator for a structure supported on a mounting surface, the structure including a base having an inner surface facing the mounting surface and an outer surface opposite the inner surface, comprising:
    a load shaft having opposing first and second ends, the first end adapted to be secured to the mounting surface, and the load shaft sized so that the second end of the load shaft extends beyond the outer surface of the base of the structure;
    an actuator having a mounting end adapted to be secured to the base and a driver spaced apart from the mounting end; and
    a resilient element including a friction spring operably interposed between the driver and the second end of the load shaft to allow relative motion between the mounting surface and the structure in the event of a seismic shock or other external applied force and to absorb or dissipate energy of such relative motion, thereby attenuating the effect on the structure of the seismic shock or other external applied force.

2. A seismic isolator according to claim 1 wherein the resilient element resists relative motion in a first direction, and farther comprising a secondary resilient element operably interposed between the driver and the mounting surface to resist relative motion in a second direction opposite the first direction.

3. A seismic isolator according to claim 2 wherein the load shaft includes a radially extending shoulder located proximal of the first end for supporting the secondary resilient element opposite the driver.

4. A seismic isolator according to claim 2 wherein the actuator or the load shaft, or both, are adjustable for selectively applying a preload to the secondary resilient element.

5. A seismic isolator according to claim 1 wherein the structure supports an item of equipment in an electric power system.

6. A seismic isolator according to claim 1 wherein no part of the seismic isolator extends below the base of the structure.

7. A seismic isolator according to claim 1 wherein the load shaft is secured to the mounting surface via a threaded mounting stud that extends outwardly from the mounting surface and through the base of the structure.

8. A seismic isolator according to claim 1, further comprising a cap secured to the second end of the load shaft to retain the resilient element.

9. A seismic isolator according to claim 8 wherein the cap is adjustably secured to the load shaft for positioning therealong to selectively apply a preload to the resilient element.

10. A seismic isolator for a structure supported on a mounting surface, the structure including a base having an inner surface facing the mounting surface and an outer surface opposite the inner surface, comprising:
- a load shaft having opposing first and second ends, the first end adapted to be secured to the mounting surface, and the load shaft sized so that the second end of the load shaft extends beyond the outer surface of the base of the structure;
- an actuator having a mounting end adapted to be secured to the base and a driver spaced apart from the mounting end, the actuator including a tubular actuator stem into which the load shaft extends; and
- a resilient element operably interposed between the driver and the second end of the load shaft to allow relative motion between the mounting surface and the structure in the event of a seismic shock or other external applied force and to absorb or dissipate energy of such relative motion, thereby attenuating the effect on the structure of the seismic shock or other external applied force.

11. A seismic isolator according to claim 10 wherein the resilient element includes a friction spring.

12. A seismic isolator according to claim 10 wherein the resilient element resists relative motion in a first direction, and further comprising a secondary resilient element operably interposed between the driver and the mounting surface to resist relative motion in a second direction opposite the first direction.

13. A seismic isolator according to claim 12 wherein the secondary resilient element includes a second friction spring.

14. A seismic isolator according to claim 12 wherein the load shaft includes a radially extending shoulder located proximal of the first end for supporting the secondary resilient element opposite the driver.

15. A seismic isolator according to claim 12 wherein the actuator or the load shaft, or both, are adjustable for selectively applying a preload to the secondary resilient element.

16. A seismic isolator according to claim 10 wherein the structure supports an item of equipment in an electric power system.

17. A seismic isolator according to claim 10 wherein the load shaft is secured to the mounting surface via a threaded mounting stud that extends outwardly from the mounting surface and through the base of the structure.

18. A seismic isolator for a structure supported on a mounting surface, the structure including a base having an inner surface facing the mounting surface and an outer surface opposite the inner surface, comprising:
- a load shaft having opposing first and second ends, the first end adapted to be secured to the mounting surface, and the load shaft sized so that the second end of the load shaft extends beyond the outer surface of the base of the structure;
- an actuator having a mounting end adapted to be secured to the base and a driver spaced apart from the mounting end;
- a primary resilient element operably interposed between the driver and the second end of the load shaft to allow relative motion between the mounting surface and the structure in the event of a seismic shock or other external applied force and to absorb or dissipate energy of such relative motion, thereby attenuating the effect on the structure of the seismic shock or other external applied force, wherein the primary resilient element resists relative motion in a first direction; and
- a secondary resilient element operably interposed between the driver and the mounting surface to resist relative motion in a second direction opposite the first direction, the secondary resilient element including a friction spring.

19. A seismic isolator according to claim 18 wherein the primary resilient element includes a friction spring.

20. A seismic isolator according to claim 18 wherein the actuator includes a tubular actuator stem into which the load shaft extends.

21. A seismic isolator according to claim 18 wherein the load shaft includes a radially extending shoulder located proximal of the first end for supporting the secondary resilient element opposite the driver.

22. A seismic isolator according to claim 18 wherein the actuator or the load shaft, or both, are adjustable for selectively applying a preload to the secondary resilient element.

23. An apparatus for protecting a structure from seismic shock or other external applied force, comprising
- a load shaft having opposing first and second ends, the first end adapted to be secured to a mounting surface on which a base of the structure is supported, such that the second end of the load shaft projects beyond the base;
- an actuator extending along the load shaft, the actuator having opposing mounting and driving ends, the mounting end located proximal of the first end of the load shaft and adapted to be supported on the structure, and the driving end extending toward the second end of the load shaft; and
- a resilient element operably interposed between the driving end of the actuator and the second end of the load shaft to allow relative motion between the mounting surface and the structure in the event of a seismic shock or other external applied force, and to absorb or dissipate energy of such motion, wherein the resilient element resists relative motion in a first direction; and
- a secondary resilient element operably interposed between the driving end of the actuator and the mounting surface to resist relative motion in a second direction opposite the first direction,
- wherein the load shaft includes a radially extending shoulder located proximal of the first end for supporting the secondary resilient element opposite the driving end of the actuator.

24. An apparatus according to claim 23 wherein:
- the resilient element includes a primary annular friction spring assembly;
- the load shaft comprises an elongate member that extends axially through the friction spring assembly; and
- the actuator includes a tubular member surrounding at least a section of the load shaft.

25. An apparatus according to claim 24 wherein the primary annular friction spring assembly resists relative motion in a first direction, and further comprising a secondary annular friction spring assembly supported on the load shaft between the driving end of the actuator and the mounting surface to resist relative motion in a second direction opposite the first direction.

26. An apparatus according to claim 23 wherein the mounting end of the actuator is securely attached to the structure.

27. An apparatus according to claim 23 wherein the actuator includes an annular driver supported proximal of the driving end of the actuator for transmitting force from the base of the structure to the primary and secondary resilient elements.

28. An apparatus according to claim 27 wherein the driver is detachable from the actuator for facilitating servicing of the apparatus after installation.

29. An apparatus according to claim 26 wherein the structure supports an item of equipment in an electric power system.

30. An apparatus according to claim 23 wherein the load shaft is secured to the mounting surface via a threaded mounting stud that extends outwardly from the mounting surface and through the base of the structure, such that no part of the apparatus extends below the base of the structure.

* * * * *